March 16, 1948.  N. E. GADDINI  2,437,950
MACHINE FOR DISTRIBUTING FRUIT IN ROWS ON DRYING TRAYS
Original Filed May 1, 1944    5 Sheets-Sheet 1

INVENTOR
N. E. Gaddini
ATTYS

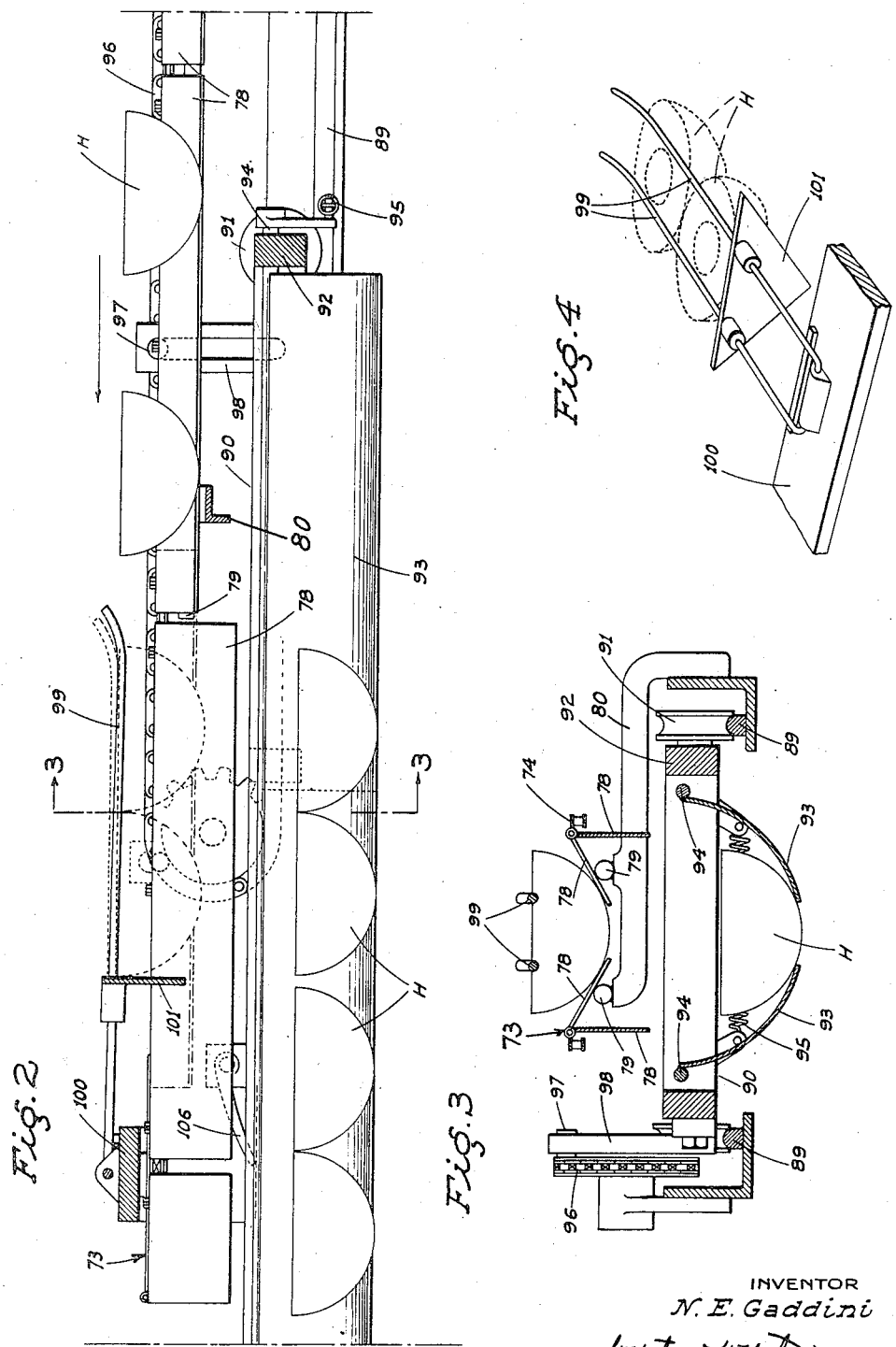

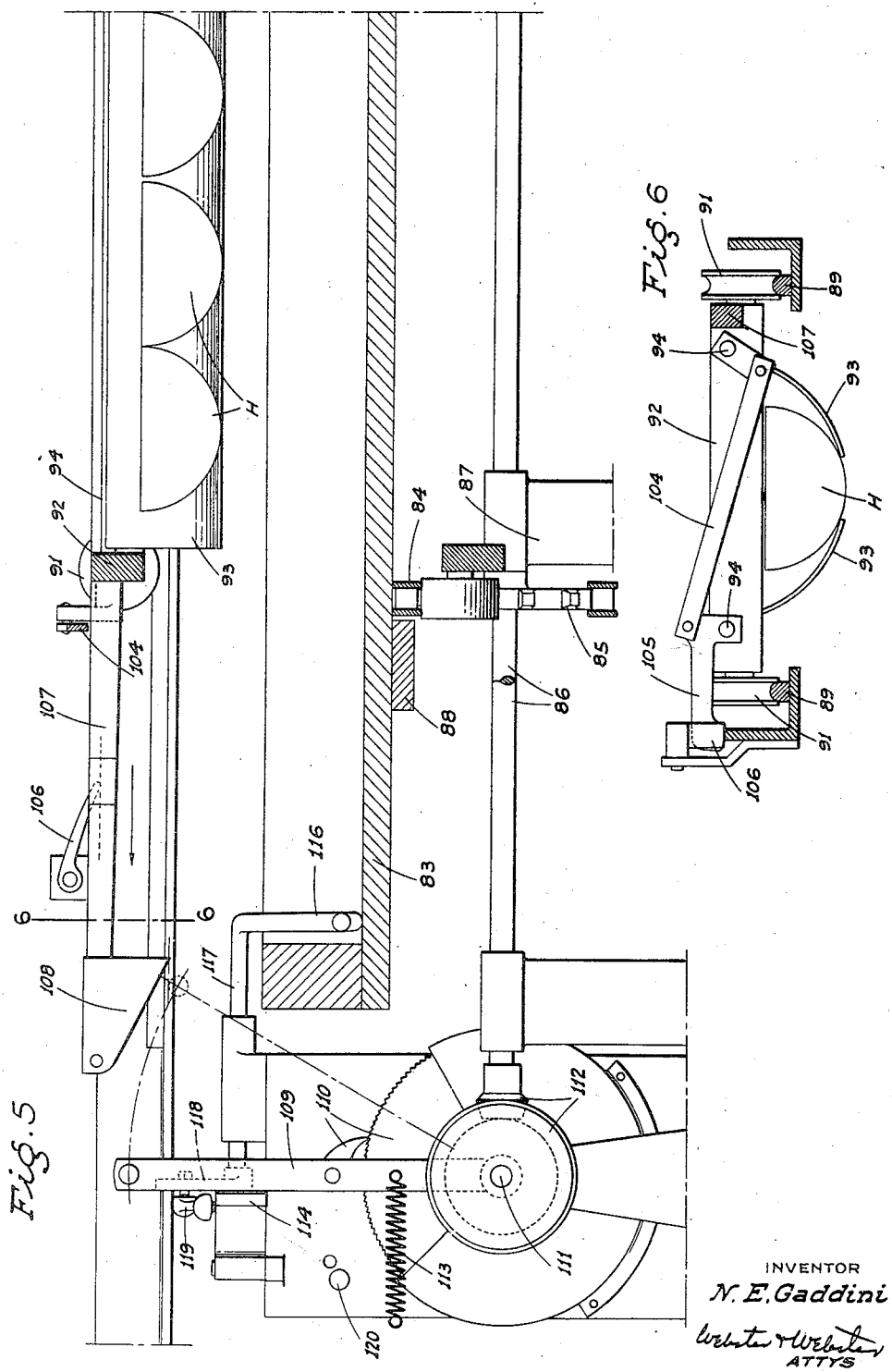

March 16, 1948. N. E. GADDINI 2,437,950
MACHINE FOR DISTRIBUTING FRUIT IN ROWS ON DRYING TRAYS
Original Filed May 1, 1944 5 Sheets-Sheet 4
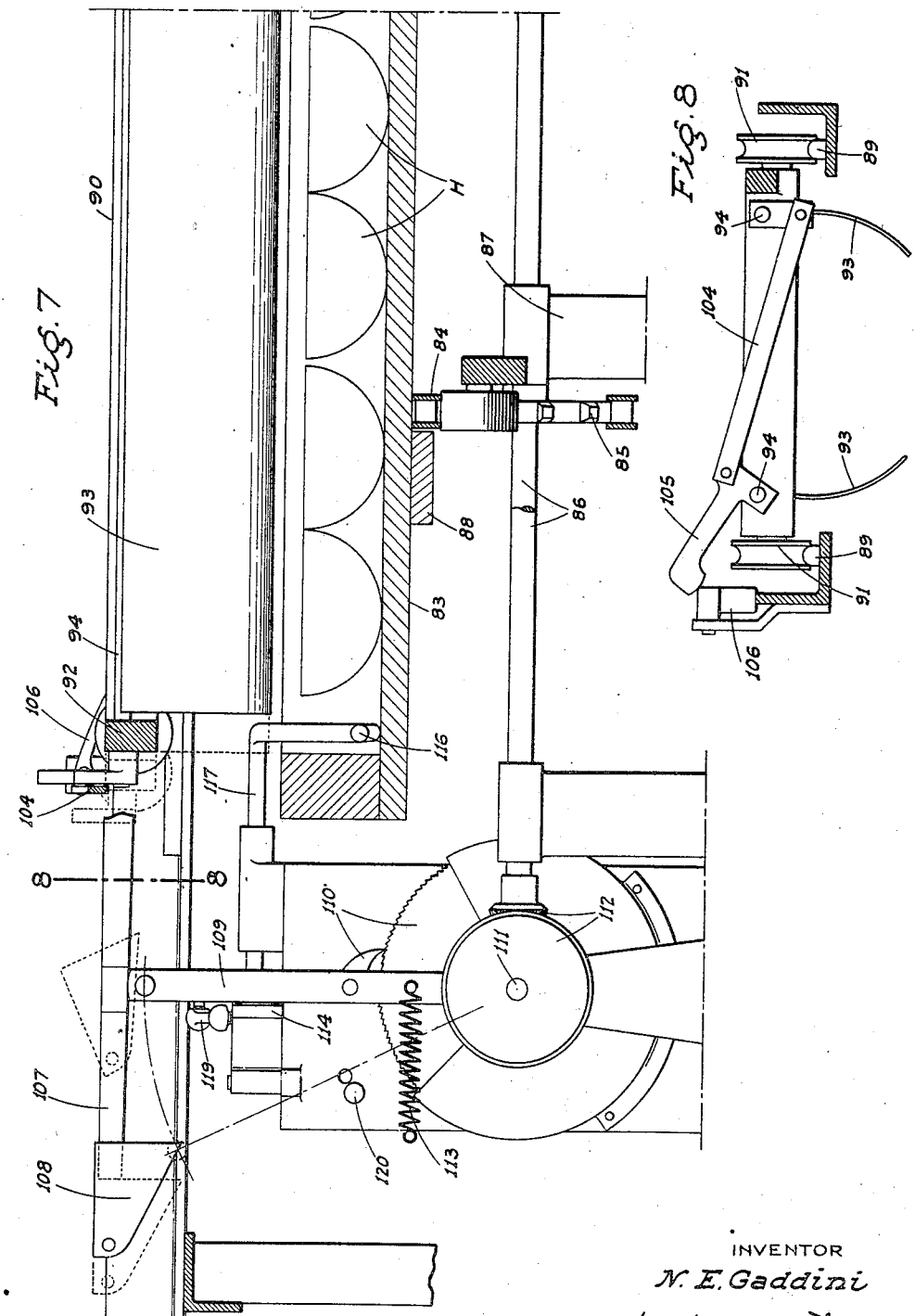
INVENTOR
N. E. Gaddini
Webster & Webster
ATTYS March 16, 1948.   N. E. GADDINI   2,437,950
MACHINE FOR DISTRIBUTING FRUIT IN ROWS ON DRYING TRAYS
Original Filed May 1, 1944   5 Sheets-Sheet 5
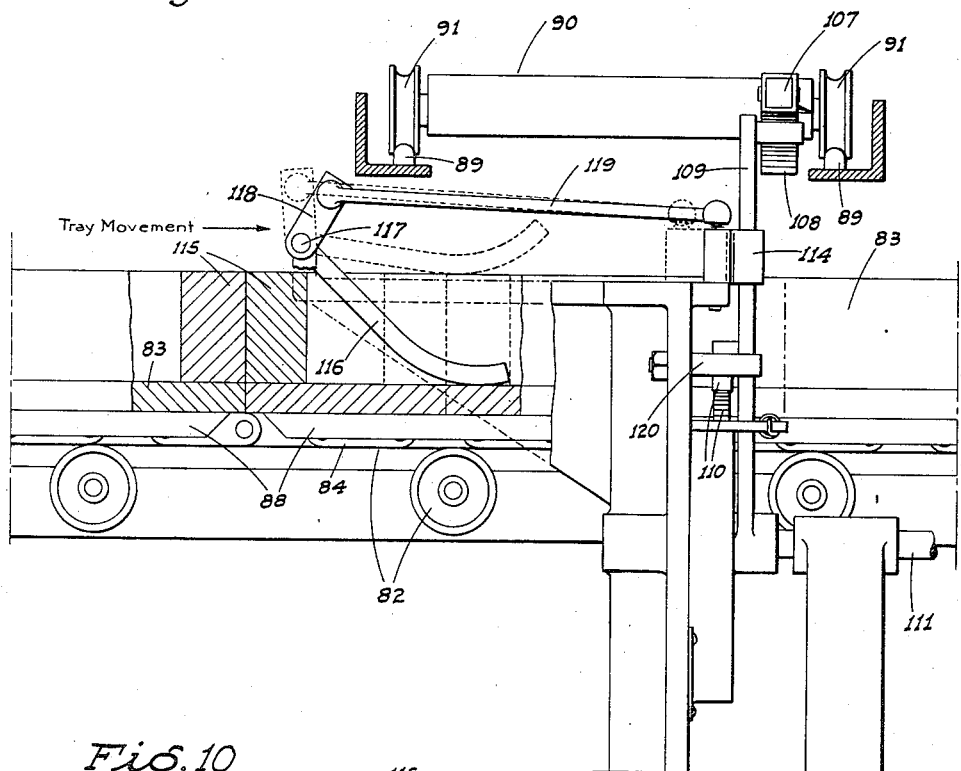
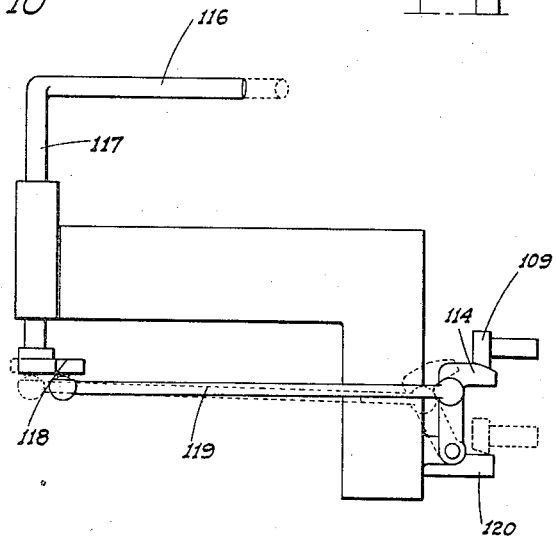
INVENTOR
N. E. Gaddini
Webster & Webster
ATTYS Patented Mar. 16, 1948

2,437,950

UNITED STATES PATENT OFFICE 2,437,950

MACHINE FOR DISTRIBUTING FRUIT IN ROWS ON DRYING TRAYS

Norman E. Gaddini, Winters, Calif.

Original application May 1, 1944, Serial No. 533,548. Divided and this application March 5, 1945, Serial No. 581,036

18 Claims. (Cl. 226—14)

This invention relates in general to fruit machinery; the present application being a division of copending application, Serial No. 533,548, filed May 1, 1944, now U. S. Patent No. 2,403,516, dated July 9, 1946.

One object of the present invention is to provide a fruit handling machine arranged to receive previously halved and pitted fruit and to automatically distribute the fruit halves on dehydrator trays in symmetrical row-by-row relation whereby to not only effect a saving in labor and time, but to also avoid bruising of the fruit halves, as is frequently attendant manual loading of dehydrator trays.

Another object of the present invention is to provide an automatic tray loading machine in which the distributing mechanism for the fruit halves is adapted to be fed, by a conveyor of special construction, directly from an automatic fruit pitting and halving machine, whereby manual handling of the fruit halves between said pitting and halving machine and the tray loading machine is entirely eliminated.

A further object of the instant invention is to provide, in an automatic tray loading machine, a novel fruit-half distributing mechanism which includes a transfer shuttle arranged to receive fruit halves from a conveyor and to deposit such halves in parallel rows onto a dehydrator tray disposed below but adjacent the shuttle; there being tray supporting and control means operative to move each tray step by step in a direction transversely of the shuttle and in predetermined timed relation thereto.

A further object of the invention is to provide a simple and inexpensive device, and yet one which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views:

Figure 2 is an enlarged fragmentary longitudinal section on line 2—2 of Fig. 1, showing the shuttle partially loaded, and as having just received a pair of fruit halves from the conveyor above.

Figure 3 is a cross section on line 3—3 of Fig. 2.

Figure 4 is a fragmentary perspective view showing the fruit-half stop and locating unit.

Figure 5 is a fragmentary longitudinal section on line 5—5 of Fig. 1, showing the shuttle as approaching a fruit depositing position.

Figure 6 is a transverse section on line 6—6 of Fig. 5, showing the release means for the shuttle cradle or fruit retaining plates.

Figure 7 is a view similar to Fig. 5, but shows the shuttle moved to adjacent the limit of its stroke and with the fruit released therefrom and deposited on the tray, but prior to the transverse shifting of the tray.

Figure 8 is a cross section on line 8—8 of Fig. 7, showing the shuttle cradle plates spread or opened to discharge the fruit therefrom.

Figure 9 is a fragmentary transverse sectional elevation on line 9—9 of Fig. 1, with the fruit trays partly broken away, and illustrating the action of the mechanism in which, when the adjacent and abutting sides of the trays are reached, releases the stop of the pawl lever which controls the transverse tray movement, and thus subsequently allows of a greater than normal lever and tray movement.

Figure 10 is a fragmentary plan of the stop release mechanism.

Figure 1:
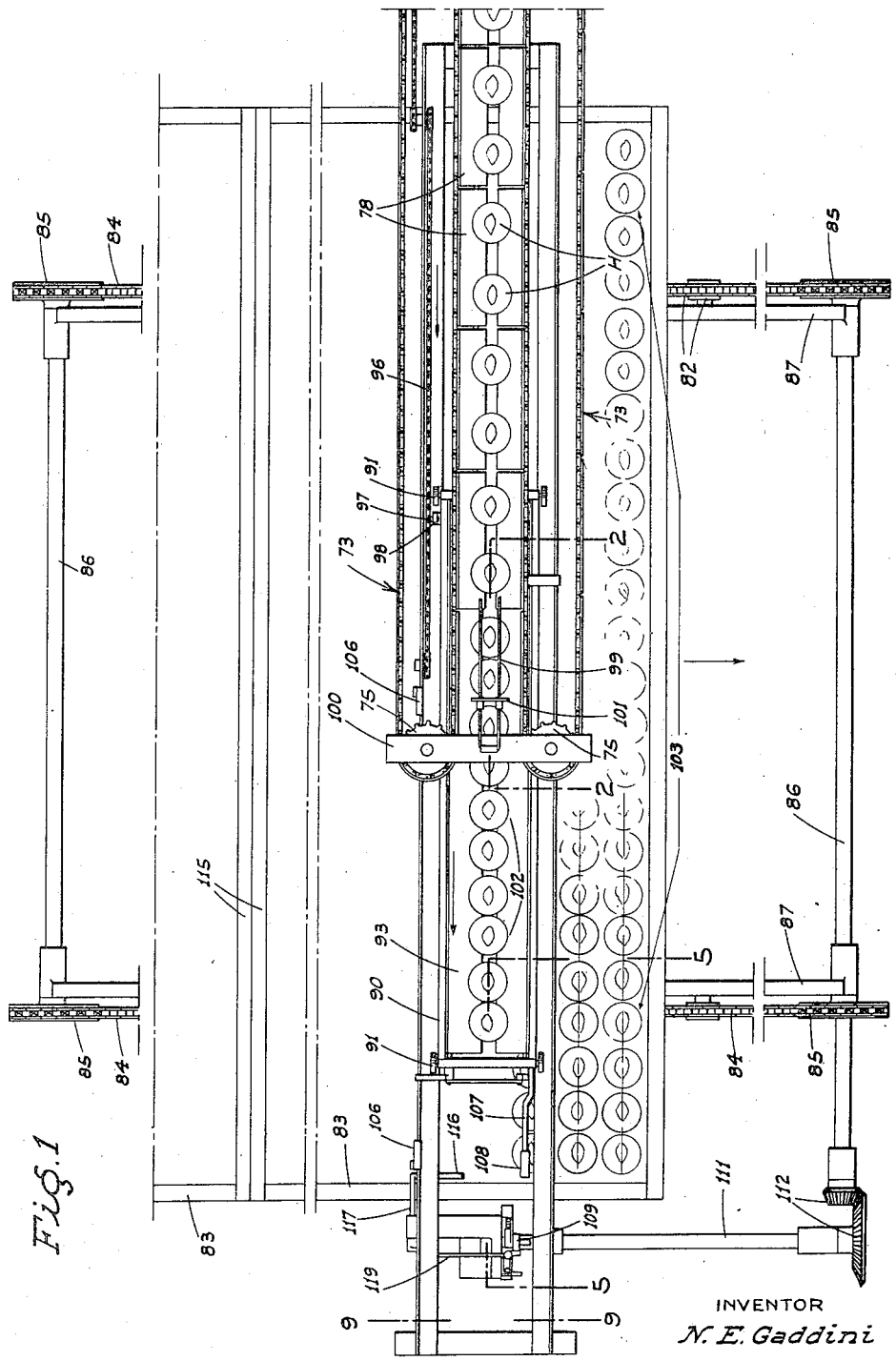
Figure 1 is a top plan view of the drying tray supporting and control mechanism, together with the means for depositing the fruit halves from the carry-off conveyor onto a transfer shuttle, and thence onto the tray in rows.

Referring now more particularly to the characters of reference on the drawings, the tray loading machine comprises a horizontal continuously moving endless conveyor, indicated generally at 73, and which conveyor comprises transversely spaced, driven endless chains 74 which run at one end on transversely spaced sprockets 75; said chains being driven so that the adjacent reaches thereof travel toward the sprockets 75, as indicated by the arrow in Fig. 1. A multiplicity of flexible and resilient conveyor plates 78 are hinged, in end to end relation, to the chains 74 with the conveyor plates of the separate chains disposed in inwardly converging relation; said flexible and resilient conveyor plates being supported, along the upper run of the conveyor, by fixed horizontal rods 79 disposed therebeneath and mounted on suitable supports 80. As so supported the conveyor plates 78 are adapted to receive fruit halves H from a fruit pitting and halving machine, as shown for example in the above identified co-pending application, and to convey said halves to a dehydrator tray-loading mechanism constructed as follows:

The end portion of the conveyor 73 which includes the sprockets 75 projects some distance in overhanging relation to a dehydrator tray-supporting and shifting unit, indicated generally at 82, and said unit being arranged to support dehydrator trays 83 in alined end to end or side by side relation, and to intermittently shift said trays in a direction transversely of or at right angles to the direction of movement of conveyor 73, as will hereinafter appear in detail. The tray supporting and shifting unit includes a pair of spaced endless chains 84 carried on sprockets 85 on parallel end shafts 86; such shafts being journaled on a supporting frame 87. The trays ride on and extend between the upper runs of chains 84, and may be held in proper alinement by chain engaging cleats 88 on the bottom of the trays. The conveyor 73 overhangs the trays 83 slightly more than one-half the width thereof.

Special rails 89 are frame-mounted horizontally above the trays but below conveyor 73 in symmetrical, parallel relation thereto, and said rails extend at the ends beyond the sides of the trays 83. A fruit-half transfer shuttle 90 is supported by wheels 91 riding on rails 89. Said shuttle includes a rectangular and elongated, open frame 92 on which said wheels are secured. Within frame 92 the shuttle carries a pair of transversely spaced, longitudinally extending fruit-half retaining or cradle plates 93 which curve downwardly and inwardly, as shown, and are normally spaced less than the diameter of the fruit halves H. The cradle plates 93 are of a length substantially equal to one-half the width of trays 83, and said plates are supported from the upper edge by rods 94 journaled at their ends in adjacent ends of frame 92. The plates are normally held in relatively closed positions (Fig. 3) by a tension spring 95 which connects said plates at one end.

Continuing back and forth, or shuttle movement, of the shuttle 90 above trays 83 is obtained from a constantly driven endless chain 96 disposed alongside the shuttle; there being a fixed pin 97 projecting laterally from the drive chain 96, and said pin riding in a vertically slotted plate 98 mounted on one side of the shuttle 90 at the adjacent end.

With each traversing movement of the shuttle 90 it is filled with a row of peach halves H from the carry-off conveyor 73 in the following manner:

As conveyor 73 advances, in the upper run, to the end overhanging trays 83, the fruit halves H as supported by conveyor plates 78 successively engage beneath a pair of holddown fingers 99 (Figs. 1-2, and 4) which extend longitudinally and swingably from a cross-head 100 on the end of the conveyor 73, and in overhanging relation to the rear end portion of said run. The fingers 99 carry a longitudinally adjustable depending stop 101. With advance of conveyor 73 the fruit halves H on each plate 78 are slid together by the stop 101, as shown in Fig. 4, and when this occurs said plates immediately run off of the ends of rods 79 and drop to a vertical or dependent position from chains 74, releasing said halves H to fall a short distance onto cradle plates 93 of the moving shuttle 90. The timing of such release with the shuttle is such as to evenly space the halves H in a row 102 on the shuttle with each traversing movement of the latter.

As the shuttle approaches the end of each traversing movement, and is filled with fruit, the cradle plates 93 automatically open, as will hereinafter appear, and the row 102, which is of a length substantially equal to one-half the width of the underlying tray, is deposited as a half-row on the tray. Thus, with one back and forth cycle, the shuttle deposits two half-tray width rows 102 on the tray in end to end alinement, forming a full cross row 103 on said tray, as indicated in Fig. 1.

The cradle plates 93 are tripped downward or opened adjacent the end of each traversing movement of shuttle 90 by a lever and link unit 104 at one end thereof, said unit being arranged to rotate rods 94 and includes a finger 105 which strikes and rides up a frame-supported, upwardly deflectible cam 106 at the proper point adjacent the end of each stroke of the shuttle.

After each full cross-row 103 of the halves H has been deposited on the tray, the latter is automatically stepped or moved transversely of the shuttle a sufficient distance to permit of the reception of the next row, and this is accomplished as follows:

The cycle of the shuttle 90 to form each full row 103 is a stroke to the right followed by a stroke to the left (on Fig. 1), and after releasing the half-row 102 corresponding to the stroke to the left, the shuttle continues in such direction some further distance. With such further movement of the shuttle the finger 105 passes beyond and drops off cam 106, so that the plates 93 again come together. Upon the reverse movement of the shuttle, the finger then passes under and raises the cam, so that no reopening of plates 93 occurs.

An extension arm 107 projects lengthwise from the left-hand end of the shuttle frame 92, and on its outer end carries a pivoted catch 108 formed to pass an upstanding lever 109 as the shuttle moves such further distance to the left, but to engage and swing said lever 109 toward the trays when the movement of the shuttle is reversed and it moves to the right. The lever 109 actuates a pawl and ratchet unit 110, which in turn drives a shaft 111 coupled in driving relation by a bevel gear and pinion assembly 112 to one of the shafts 86, which when rotated in one direction advance tray supporting chains 84. The above assembly is arranged so that such swinging movement of lever 109 causes the correct movement of the tray underlying the shuttle. After it is released by the catch 108, the lever 109 is returned by spring 113 to its normal position against a stop 114.

When the last full row 103 of halves H is deposited in the tray underlying the shuttle, the tray must be slipped ahead on the next movement thereof an additional distance in order to shift the abutting end cleats 115 of adjacent trays beyond the transverse vertical plane in which the shuttle releases the fruit halves therefrom, and to properly position the following one of said adjacent trays to receive the initial full row 103 therein. This is accomplished by means of a trigger 116 which trails in the leading one of said adjacent trays at the side; said trigger extending from a cross-shaft 117 having a radial lever 118 connected by a link 119 with stop 114 which is pivotally mounted to swing out of the way of the tray advance control lever 109. As the abutting end cleats 115 advance with the trays to the position where the leading tray is to receive the last full row 103, the trigger 116 rides up onto the abutting cleats 115, rotating shaft 117, and by means of link 119 withdrawing the stop 114 from behind lever 109. When this occurs the lever 109 is pulled by spring 113 against a stop pin 120 and thus substantially further away from the trays than normal. Consequently on the next stroke to the right and after catch 108 has engaged said lever, the latter is thrown a greater distance than for normal row-to-row spacing, and the abutted end cleats 115 move ahead the required distance to properly position the trailing one of said adjacent trays to receive its first full row 103. When trigger 116 falls into said trailing tray the normal position of stop 114 is reestablished.

The leading or full tray, which has been automatically filled with rows of fruit halves, is then removed from the tray-supporting and shifting unit 82 without in any way disturbing continued operation of the latter.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A drying tray loading machine comprising, in combination, a substantially horizontal driven conveyor on which cut fruit is adapted to be conveyed, means below said conveyor at one end thereof to support a drying tray for lateral movement, a fruit transfer shuttle mechanism mounted for movement beneath said end of the conveyor lengthwise thereof and transversely of the tray, means to reciprocate the shuttle mechanism, means operative to feed fruit from the conveyor onto the moving shuttle mechanism in a row, and means to release the row of fruit from the shuttle mechanism onto the drying tray when said shuttle mechanism reaches a predetermined position relative to said tray.

2. A drying tray loading machine comprising, in combination, a substantially horizontal driven conveyor on which cut fruit is adapted to be conveyed, means below said conveyor at one end thereof to support a drying tray for lateral movement, a fruit transfer shuttle mechanism mounted for movement beneath said end of the conveyor lengthwise thereof and transversely of the tray, means to reciprocate the shuttle mechanism, means operative to feed fruit from the conveyor onto the moving shuttle mechanism in a row, and means to release the row of fruit from the shuttle mechanism onto the drying tray when said shuttle mechanism reaches a predetermined position relative to said tray; said shuttle mechanism comprising a frame, and a fruit carrier including a part pivotally mounted on the frame for movement between a normal fruit supporting position to a fruit discharging position, said carrier part being responsive to said release means.

3. A drying tray loading machine as in claim 2 in which said fruit carrier includes a pair of longitudinally extending plates disposed in side by side relation and pivoted to the frame for downward and laterally outward swinging movement relative to each other, and means normally but yieldably maintaining said plates in adjacent, fruit supporting position; said release means comprising a cam assembly arranged to swing said plates.

4. A drying tray loading machine comprising, in combination, a substantially horizontal driven conveyor on which cut fruit is adapted to be conveyed, means below said conveyor at one end thereof to support a drying tray for lateral movement, a fruit transfer shuttle mechanism mounted for movement beneath said end of the conveyor lengthwise thereof and transversely of the tray, means to reciprocate the shuttle mechanism, means operative to feed fruit from the conveyor onto the moving shuttle mechanism in a row, and means to release the row of fruit from the shuttle mechanism onto the drying tray when said shuttle mechanism reaches a predetermined position relative to said tray; said shuttle mechanism including an open frame, a pair of longitudinally extending cradle plates disposed in side by side relation and mounted in the frame for downward separating movement, and means normally but yieldably holding said plates in adjacent, fruit supporting relation, said release means being carried in part by the shuttle mechanism and operative to cause downward separating movement of said plates when the shuttle mechanism reaches said predetermined position relative to the tray.

5. A drying tray loading machine comprising, in combination, a substantially horizontal driven conveyor on which cut fruit is adapted to be conveyed, means below said conveyor at one end thereof to support a drying tray for lateral movement, a fruit transfer shuttle mechanism mounted for movement beneath said end of the conveyor lengthwise thereof and transversely of the tray, means to reciprocate the shuttle mechanism, means operative to feed fruit from the conveyor onto the moving shuttle mechanism in a row, and means to release the row of fruit from the shuttle mechanism onto the drying tray when said shuttle mechanism reaches a predetermined position relative to said tray; said release means including a movable finger projecting from the shuttle mechanism, and a cam mounted in the path of said finger to engage and move the same when said mechanism reaches said predetermined position.

6. A drying tray loading machine comprising, in combination, a substantially horizontal driven conveyor on which cut fruit is adapted to be conveyed, means below said conveyor at one end thereof to support a drying tray for lateral movement, a fruit transfer shuttle mechanism mounted for movement beneath said end of the conveyor lengthwise thereof and transversely of the tray, means to reciprocate the shuttle mechanism, means operative to feed fruit from the conveyor onto the moving shuttle mechanism in a row, means to release the row of fruit from the shuttle mechanism onto the drying tray when said shuttle mechanism reaches a predetermined position relative to said tray, and means operative thereafter to advance the tray laterally of the conveyor a predetermined distance to position the tray for reception of the next row of fruit.

7. A drying tray loading machine as in claim 6 in which said tray supporting means comprises an endless conveyor upon which drying trays are disposed in abutting end to end relation; said last named means including a pawl and ratchet unit connected in operative relation to said endless conveyor and having an actuating lever, and means on the shuttle mechanism arranged to engage and swing said lever in a tray advancing direction after the shuttle mechanism has released a row of fruit onto the row.

8. A drying tray loading machine as in claim 6 in which said tray supporting means comprises an endless conveyor upon which drying trays are disposed in abutting end to end relation; said last named means including a pawl and ratchet unit connected in operative relation to said endless conveyor and having an actuating lever, means on the shuttle mechanism arranged to engage and swing said lever in a tray advancing direction after the shuttle mechanism has released a row of fruit onto the row, and other means actuated by said abutting tray ends arranged to position said lever to obtain a proportionately greater advance of the trays when said abutting ends thereof reach a given position beneath said shuttle mechanism.

9. A drying tray loading machine comprising a substantially horizontal, driven conveyor on which cut fruit is adapted to be conveyed in single-file order, means below said conveyor at one end thereof to support a drying tray for lateral movement, the conveyor overhanging substantially one-half the tray, a fruit transfer shuttle mechanism mounted for movement transversely of and above the tray and lengthwise beneath the conveyor, means to reciprocate said shuttle mechanism, means to feed fruit from the conveyor onto the shuttle mechanism in a row with each stroke of said mechanism, means operative adjacent the end of each stroke to discharge the row from the shuttle mechanism onto the tray, said mechanism discharging onto one-half of the tray on one stroke and onto the other half of the tray but in alinement on the following stroke of each cycle, and means to advance the tray laterally a predetermined distance after each such cycle of the shuttle mechanism.

10. A drying tray loading machine comprising a substantially horizontal, driven conveyor on which cut fruit is adapted to be conveyed in single-file order, means below said conveyor at one end thereof to support a drying tray for lateral movement, the conveyor overhanging substantially one-half the tray, a fruit transfer shuttle mechanism mounted for movement transversely of and above the tray and lengthwise beneath the conveyor, means to reciprocate said shuttle mechanism, means to feed fruit from the conveyor onto the shuttle mechanism in a row with each stroke of said mechanism, means operative adjacent the end of each stroke to discharge the row from the shuttle mechanism onto the tray, said mechanism discharging onto one-half of the tray on one stroke and onto the other half of the tray but in alinement on the following stroke of each cycle, and means to advance the tray laterally a predetermined distance after each such cycle of the shuttle mechanism; said shuttle mechanism discharging means including a movable finger mounted on and projecting from said shuttle mechanism, and a cam mounted in the path of said finger adjacent the end of each stroke of said mechanism whereby to engage and move the finger and cause discharge of the row of fruit.

11. A drying tray loading machine comprising a substantially horizontal, driven conveyor on which cut fruit is adapted to be conveyed in single-file order, means below said conveyor at one end thereof to support a drying tray for lateral movement, the conveyor overhanging substantially one-half the tray, a fruit transfer shuttle mechanism mounted for movement transversely of and above the tray and lengthwise beneath the conveyor, means to reciprocate said shuttle mechanism, means to feed fruit from the conveyor onto the shuttle mechanism in a row with each stroke of said mechanism, means operative adjacent the end of each stroke to discharge the row from the shuttle mechanism onto the tray, said mechanism discharging onto one-half of the tray on one stroke and onto the other half of the tray but in alinement on the following stroke of each cycle, and means to advance the tray laterally a predetermined distance after each such cycle of the shuttle mechanism; said last named means being responsive to and actuated by shuttle mechanism movement between discharges of said mechanism.

12. A drying tray loading machine comprising a conveyor including a substantially horizontal conveyor including transversely spaced endless chains, flexible and resilient conveyor plates hinged to said chains and normally projecting laterally inwardly in matching, fruit supporting relation, and stationary rods beneath said conveyor plates supporting the same in the upper run of the conveyor against lowering movement from said normal position; means below said conveyor at the discharge end thereof to support a drying tray for lateral movement, a fruit transfer shuttle mechanism mounted for movement lengthwise and beneath the discharge end of the conveyor, means to reciprocate said shuttle mechanism, the conveyor plate supporting rods terminating short of said end of the conveyor whereby when the plates reach such end they escape the rods and drop to a depending position, releasing the supported fruit into the shuttle mechanism, in a row, and means to release the row of fruit from the shuttle mechanism onto the tray when said shuttle mechanism reaches a predetermined position relative to the tray.

13. A drying tray loading machine as in claim 12 in which the fruit is disposed on said conveyor and supported by the plates in single file order, a hold-down finger unit mounted on the conveyor adjacent said discharge end and under which the fruit engages immediately prior to escape of the plates from the rods, and a fruit stop element depending from said finger unit to properly position fruit on said plates prior to release of the fruit onto the shuttle mechanism.

14. A drying tray loading machine comprising, in combination, a substantially horizontal driven conveyor on which cut fruit is adapted to be conveyed, means below said conveyor at one end thereof to support a drying tray for lateral movement, a fruit transfer shuttle mechanism mounted for movement beneath said end of the conveyor lengthwise thereof and transversely of the tray, means to reciprocate the shuttle mechanism, means operative to feed fruit from the conveyor onto the moving shuttle mechanism in a row, and means to release the row of fruit from the shuttle mechanism onto the drying tray when said shuttle mechanism reaches a predetermined position relative to said tray; said shuttle mechanism reciprocating means comprising an endless, driven chain mounted alongside of said mechanism with the runs of the chain vertically spaced, a vertically slotted member fixed on the shuttle mechanism and upstanding adjacent the chain, and a pin fixed on the chain and projecting into the slot in said member.

15. A drying tray loading machine comprising, in combination, a substantially horizontal driven conveyor on which cut fruit is adapted to be conveyed, means below said conveyor at one end thereof to support a drying tray for lateral movement, a pair of transversely spaced rails disposed horizontally below said end of the conveyor and extending lengthwise thereof and across the tray, a shuttle mechanism carriage supported on said rails for movement beneath said end of the conveyor and transversely of the tray, an endless, driven chain mounted alongside the path of movement of the shuttle mechanism, means between the chain and said mechanism to reciprocate the latter, means operative to feed fruit from the conveyor onto the moving shuttle mechanism in a row, and means to release the row of fruit from the shuttle mechanism onto the drying tray when said shuttle mechanism reaches a predetermined position relative to the tray.

16. A drying tray loading machine comprising, in combination, a substantially horizontal driven conveyor on which cut fruit is adapted to be conveyed, means below said conveyor at one end thereof to support a drying tray for lateral movement, a fruit transfer shuttle mechanism mounted for movement beneath said end of the conveyor lengthwise thereof and transversely of the tray, means to reciprocate the shuttle mechanism, means operative to feed fruit from the conveyor onto the moving shuttle mechanism in a row, and means to release the row of fruit from the shuttle mechanism onto the drying tray when said shuttle mechanism reaches a predetermined position relative to said tray; said tray supporting means comprising a pair of spaced endless chains mounted with the upper runs thereof in horizontal alignment and for supporting engagement with the tray, and a sprocket shaft about which said chains engage at one end.

17. A drying tray loading machine comprising, in combination, a substantially horizontal driven conveyor on which cut fruit is adapted to be conveyed, means below said conveyor at one end thereof to support a drying tray for lateral movement, a fruit transfer shuttle mechanism mounted for movement beneath said end of the conveyor lengthwise thereof and transversely of the tray, means to reciprocate the shuttle mechanism, means operative to feed fruit from the conveyor onto the moving shuttle mechanism in a row, and means to release the row of fruit from the shuttle mechanism onto the drying tray when said shuttle mechanism reaches a predetermined position relative to said tray; said tray supporting means comprising a pair of spaced endless chains mounted with the upper runs thereof in horizontal alignment and for supporting engagement with the tray, and a sprocket shaft about which said chains engage at one end, there being means operative to rotate said shaft and advance the supported tray a predetermined distance after release of each row of fruit from the shuttle mechanism.

18. A drying tray loading machine comprising, in combination, a substantially horizontal driven conveyor on which cut fruit is adapted to be conveyed, means below said conveyor at one end thereof to support a drying tray for lateral movement, a fruit transfer shuttle mechanism mounted for movement beneath said end of the conveyor lengthwise thereof and transversely of the tray, means to reciprocate the shuttle mechanism, means operative to feed fruit from the conveyor onto the moving shuttle mechanism in a row, and means to release the row of fruit from the shuttle mechanism onto the drying tray when said shuttle mechanism reaches a predetermined position relative to said tray; said tray supporting means comprising a pair of spaced endless chains mounted with the upper runs thereof in horizontal alignment and for supporting engagement with the tray, and a sprocket shaft about which said chains engage at one end, there being means responsive to shuttle mechanism movement operative to rotate said shaft and advance the supported tray a predetermined distance after release of said row of fruit from the shuttle mechanism.

NORMAN E. GADDINI.

REFERENCES CITED

The following references are of record in the file of this patent:

UNITED STATES PATENTS

| Number | Name | Date |
| --- | --- | --- |
| 1,090,855 | Jagenberg | Mar. 24, 1914 |
| 1,312,640 | Mallinckrodt | Aug. 12, 1919 |
| 1,896,639 | Meyer et al. | Feb. 7, 1933 |
| 2,297,253 | Scotti | Sept. 29, 1942 |